United States Patent
Souren

(10) Patent No.: US 8,492,462 B2
(45) Date of Patent: Jul. 23, 2013

(54) COLOUR STABLE THERMOPLASTIC COMPOSITION

(75) Inventor: Franciscus J. M. Souren, Schin op Geul (NL)

(73) Assignee: DSM IP Assets B.V., Heerlen (NL)

( * ) Notice: Subject to any disclaimer, the term of this patent is extended or adjusted under 35 U.S.C. 154(b) by 196 days.

(21) Appl. No.: 12/988,377

(22) PCT Filed: Apr. 20, 2009

(86) PCT No.: PCT/EP2009/054671
§ 371 (c)(1),
(2), (4) Date: Jan. 7, 2011

(87) PCT Pub. No.: WO2009/130185
PCT Pub. Date: Oct. 29, 2009

(65) Prior Publication Data
US 2011/0112227 A1    May 12, 2011

(30) Foreign Application Priority Data
Apr. 22, 2008   (EP) .................................... 08007756

(51) Int. Cl.
*C08K 5/34*   (2006.01)
*C08K 5/51*   (2006.01)
*C08K 5/00*   (2006.01)

(52) U.S. Cl.
USPC ............................ 524/106; 524/147; 524/151

(58) Field of Classification Search
USPC .......................................... 524/106, 147, 151
See application file for complete search history.

(56) References Cited

U.S. PATENT DOCUMENTS

| 2,751,370 A | 6/1956 | Roussel |
| 3,452,056 A | 6/1969 | Sundholm |
| 3,524,832 A * | 8/1970 | Green ........................... 524/206 |
| 4,520,150 A | 5/1985 | Golder |

OTHER PUBLICATIONS

International Search Report for PCT/EP2009/054671, mailed Aug. 14, 2009.

* cited by examiner

*Primary Examiner* — John J Figueroa
*Assistant Examiner* — Atnaf Admasu
(74) *Attorney, Agent, or Firm* — Nixon & Vanderhye P.C.

(57) ABSTRACT

The present invention relates to a color stable thermoplastic composition comprising a copolyester elastomer; and a stabilizer comprising (i) an aromatic amine; and (ii) a di-substituted imidazoline, wherein the color lightness (L*) of the composition is greater than 50. The invention also relates to the molded articles produced from the color stable thermoplastic compositions and the use thereof in automotive applications.

13 Claims, No Drawings

COLOUR STABLE THERMOPLASTIC COMPOSITION

This application is the U.S. national phase of International Application No. PCT/EP2009/054671, filed 20 Apr. 2009, which designated the U.S. and claims priority to European Application No. 08007756.3, filed 22 Apr. 2008, the entire contents of each of which are hereby incorporated by reference.

This invention relates to colour stable thermoplastic compositions and, in particular, natural and coloured copolyester elastomers which are suitable for use at elevated temperatures. The invention also relates to the moulded articles produced from the colour stable thermoplastic compositions and the use thereof. The invention further relates to a stabilizer package which is used in colour stable copolyester elastomer compositions.

One problem manufacturers have encountered with many thermoplastic elastomer compositions is the tendency of these elastomers to react with molecular oxygen in a degradation process called "autoxidation". This degradation process results in undesirable changes, such as product discoloration and loss of physical properties. Autoxidation may be initiated by heat (thermo-oxidative degradation), high energy radiation (photodegradation), mechanical stress, catalyst residues, or through reaction with other impurities. Thermo-oxidation and photodegradation processes are initiated with the formation of free radicals. These free radicals react rapidly with oxygen to from peroxy radicals. These peroxy radicals may further react with the polymer chains leading to the formation of hydroperoxides. On exposure to additional heat or light, hydroperoxides decompose to yield more radicals that can reinitiate the degradation process.

To combat the above degradation reactions a variety of anti-oxidants and stabilizers are added to copolyester elastomers. The addition of stabilizers is particularly important in retaining the mechanical properties of the material after processing and, even more importantly, after use at elevated temperatures (i.e. greater than 100° C.). Copolyester elastomers are typically produced with the addition of carbon black or other dark pigment in which colour retention is not an issue. For example, airbag covers are moulded in a dark colour, and where a colour is required, it is applied in a further coating step. However, there is a trend towards omitting the coating step in favour of the application of natural or in-colour moulding products.

However, it has been observed that the colour retention of copolyester elatomers is not sufficient, even if the composition already contains one or more stabilizers and anti-oxidants. Moreover, the inclusion of heat stabilizers, such as some aromatic amines, actually worsens colour retention during processing, with the addition of anti-oxidants unable to adequately compensate.

The use of aromatic amines as a stabilizer in elastomer compositions is well known. U.S. Pat. No. 4,520,150 teaches that aromatic amines stabilizers lead to poor colour stability. U.S. Pat. No. 4,520,150 solves this problem through the selection of a specific aromatic amine (3,5-di-tert-butyl-4-hydroxyhydrocinnamic acid triester with 1,3,5-tris-(2-hydroxyethyl)-s-triazine-2,4,6-(1H,3H,5H)trione), which when added to a copolyester elastomer, possesses a white appearance after being injection moulded. While U.S. Pat. No. 4,520,150 provides one solution, in doing so, it highlights the limited range of stabilizers available for use in light coloured copolyester elastomer compositions.

The problem with having a limited number of stabilizers which exhibit good initial colour retention in elastomer compositions is that there is little opportunity to also optimise other parameters, such as heat aging performance, processability, mechanical properties, price, availability and compatibility with other additives.

Accordingly, there is a need for an alternative stabilizer or stabilizer package which enables copolyester elastomer compositions to maintain good colour retention after moulding and after exposure to elevated temperatures.

In one embodiment of the present invention there is provided a colour stable thermoplastic composition comprising:
A. a copolyester elastomer; and
B. a stabilizer package comprising:
  i. an aromatic amine; and
  ii. a di-substituted imidazoline,
wherein the colour lightness (L*) of the composition is greater than 50.

It has been surprisingly found that aromatic amine heat stabilizers exhibit enhanced colour stability under elevated temperatures when combined with a di-substituted imidazoline. Di-substituted imidazolines are thermally stable organic nitrogenous bases, which are commonly used as surfactants. Di-substituted imidazolines are used as a dispersant in polymeric compositions containing carbon black due to the compounds ability to form cations which are strongly absorbed onto the carbon black particles.

The colour stable thermoplastic composition of the present invention may be applied to natural and coloured copolyester elastomers with a colour lightness (L*) of greater than 50. The discolouration of natural and lightly coloured elastomers is easily observed and gives the impression of the degradation of the elastomer material. The combination of stabilizers of the present invention reduces degradation of the elastomer material, thereby increasing the range of high temperature applications available to lightly coloured copolyester elastomers. Enhanced colour stability also provides greater flexibility for in-mold coloring and enables better colour matching with other materials.

The composition may comprise greater than 0 to 5 parts by weight stabilizer package B relative to 100 parts by weight copolyester elastomer A. However, to obtain the desired colour stabilizing effect at least 0.5 parts by weight stabilizer package B relative to 100 parts by weight copolyester elastomer A is preferred. More preferably, relative to 100 parts by weight copolyester elastomer A, the composition comprises 1 to 4 parts by weight stabilizer package B.

To achieve the synergistic effect between the co-stabilizers in the stabilizer package, the weight ratio of the aromatic amine B(i) to the di-substituted imidazoline B(ii) preferably ranges between 0.1:1 and 10:1, more preferably between 0.3:1 and 5:1, even more preferably between 0.5:1 and 4:1 and most preferably between 1:1 and 3:1.

Preferably, components A+B represent at least 50 wt. %, more preferably at least 70 wt. % and even more preferably at least 90 wt. % of the total weight of the colour stable thermoplastic composition.

As would be expected, the benefits of the colour stabilizer are most noticeable on natural (i.e copolyester elastomers with no added colourants) or lightly coloured compositions which have a colour lightness (L*) of greater than 50, more preferably greater than 75 and even more preferably greater than 85 and most preferably greater than 90.

The colour lightness (L*) is determined according to the CIELAB system which is a standard colour system well known in the art of colour and appearance to describe the effective "colour" of an object. The differences in colour between a reference and a test specimen can easily be expressed in terms of the CIELAB value which indicate both magnitude and direction of colour difference. Therefore, the CIELAB system can be used to measure the colour of the colour stable thermoplastic compositions of the invention and, in particular the lightness of the colour. For example, an L* value of 100 is pure white, or completely reflective at all wavelengths, whereas an L* value of 0 is pure black, or absorbing all wavelengths of light. C*, however, is a measure of chroma (saturation) and is a vector distance from the center (L* axis) of the colour space. Hue)(h° is the third parameter and is represented as an angle ranging from 0° to 360°, where 0°=red, 90°=yellow, 180°=green, and 270°=blue.

It has been determined that, as the elastomeric composition ages during normal usage due to exposure to elevated temperatures of above 100° C. or 110° C. or higher, the L* values decrease (colour become darker) and the C* values increase. The hue tends to remain near 90° C. (i.e., yellow). It is desirable to minimize the initial C* value (less yellow) of the elastomer composition and also inhibit or prevent C* increase over time, the C* rate of increase, or preferably both, due to exposure to elevated temperatures, for example. It is also desirable to maximize the initial L* (towards white) value and inhibit or prevent its decrease towards black over time due to exposure to elevated temperatures having a similarly disadvantageous effect on the appearance of elastomer composition and moulded articles produced therefrom.

The L* value of the natural uncompounded resin is typically at least 94, with the addition of stabilising additives and the compounding process reducing the L* value further, e.g. 92 or less. The decline in the L* value continues with the degradative effects of heat aging.

The colour lightness and the deterioration therein may also be suitably determined through ultraviolet-visible (UV-VIS) spectroscopy measurements.

Preferably, the composition further comprises a thioether which may contribute to an increased L* in the initial elastomer composition.

Copolyester Elastomers

Copolyester elastomers are thermoplastic polymers with elastomeric properties comprising hard blocks consisting of respectively polyester segments, and soft blocks consisting of segments of another polymer. Such polymers are also known as block-copolymers. The polyester segments in the hard blocks of the copolyester elastomers are generally composed of repeating units derived from at least one alkylene diol and at least one aromatic or cycloaliphatic dicarboxylic acid.

The hard blocks typically consist of a polyester having a melting temperature or glass temperature, where applicable, well above room temperature, and may be as high as 300° C. or even higher. Preferably the melting temperature or glass temperature is at least 150° C., more preferably at least 170° C. or even at least 190° C. Still more preferably the melting temperature or glass temperature of the hard blocks is in the range of 200-280° C., or even 220-250° C. The soft blocks typically consist of segments of an amorphous polymer having a glass transition temperature well below room temperature and which may be as low as −70° C. or even lower. Preferably the glass transition temperature of the amorphous polymer is at most 0° C., more preferably at most −10° C. or even at most −20° C. Still more preferably the glass transition temperature of the soft blocks is in the range of −20--−60° C., or even −30--−50° C.

Suitably, the copolyester elastomer is a copolyesterester elastomer, a copolycarbonateester elastomer, and/or a copolyetherester elastomer; i.e. a copolyester block copolymer with soft blocks consisting of segments of polyesters, polycarbonate or, respectively, polyether. Suitable copolyesterester elastomers are described, for example, in EP-0102115-B1. Suitable copolycarbonateester elastomers are described, for example, in EP-0846712-B1. Copolyester elastomers are available, for example, under the trade name Arnitel, from DSM Engineering Plastics B.V. The Netherlands.

Preferably, the copolyester elastomer in the thermoplastic composition is a thermoplastic ether ester block copolymer elastomer (TPE-E) or copolyetherester elastomer. This is a class of thermoplastic elastomers that consists of block copolymers of alternating hard and soft segments connected by ester and ether linkages.

Copolyetherester elastomers have soft segments derived from at least one polyalkylene oxide glycol. Copolyetherester elastomers and the preparation and properties thereof are in the art and for example described in detail in Thermoplastic Elastomers, 2nd Ed., Chapter 8, Carl Hanser Verlag (1996) ISBN 1-56990-205-4, Handbook of Thermoplastics, Ed. O. Otabisi, Chapter 17, Marcel Dekker Inc., New York 1997, ISBN 0-8247-9797-3, and the Encyclopedia of Polymer Science and Engineering, Vol. 12, pp. 75-117 (1988), John Wiley and Sons, and the references mentioned therein.

The aromatic dicarboxylic acid in the hard blocks of the polyetherester elastomer suitably is selected from the group consisting of terephthalic acid, isophthalic acid, phthalic acid, 2,6-naphthalenedicarboxylic acid and 4,4-diphenyldicarboxylic acid, and mixtures thereof. Preferably, the aromatic dicarboxylic acid comprises terephthalic acid, more preferably consists for at least 50 mole %, still more preferably at least 90 mole %, or even fully consists of terephthalic acid, relative to the total molar amount of dicarboxylic acid.

The alkylene diol in the hard blocks of the polyetherester elastomer suitably is selected from the group consisting of ethylene glycol, propylene glycol, butylene glycol, 1,2-hexane diol, 1,6-hexamethylene diol, 1,4-butane diol, benzene dimethanol, cyclohexane diol, cyclohexane dimethanol, and mixtures thereof. Preferably, the alkylene diol comprises ethylene glycol and/or 1,4 butane diol, more preferably consists for at least 50 mole %, still more preferably at least 90 mole %, or even fully consists of ethylene glycol and/or 1,4 butane diol, relative to the total molar amount of alkylene diol.

The hard blocks of the polyetherester elastomer most preferably comprise or even consist of polybutylene terephthalate segments.

Suitably, the polyalkylene oxide glycol is a homopolymer or copolymer on the basis of oxiranes, oxetanes and/or oxolanes. Examples of suitable oxiranes, where upon the polyalkylene oxide glycol may be based, are ethylene oxide and propylene oxide. The corresponding polyalkylene oxide glycol homopolymers are known by the names polyethylene glycol, polyethylene oxide, or polyethylene oxide glycol (also abbreviated as PEG or PEO), and polypropylene glycol, polypropylene oxide or polypropylene oxide glycol (also abbreviated as PPG or PPO), respectively. An example of a suitable oxetane, where upon the polyalkylene oxide glycol may be based, is 1,3-propanediol. The corresponding polyalkylene oxide glycol homopolymer is known by the name of poly(trimethylene)glycol. An example of a suitable oxolane, where upon the polyalkylene oxide glycol may be based, is tetrahydrofuran. The corresponding polyalkylene oxide glycol homopolymer is known by the name of poly(tretramethylene)glycol (PTMG) or polytetrahydrofuran (PTHF). The polyalkylene oxide glycol copolymer can be random copolymers, block copolymers or mixed structures thereof. Suitable copolymers are, for example, ethylene oxide/polypropylene oxide block-copolymers, (or EO/PO block copolymer), in particular ethylene-oxide-terminated polypropylene oxide glycol.

The polyalkylene oxide can also be based on the etherification product of alkylene diols or mixtures of alkylene diols or low molecular weight poly alkylene oxide glycol or mixtures of the aforementioned glycols.

Preferably, the polyalkylene oxide glycol used in the colour stable thermoplastic composition according to the invention is selected from the group consisting of polypropylene oxide glycol homopolymers (PPG), ethylene oxide/polypropylene oxide block-copolymers (EO/PO block copolymer) and poly(tretramethylene)glycol (PTMG), and mixtures thereof.

Aromatic Amines

Aromatic amines that are useful in the practice of the present invention can be represented by the general formula

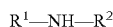

where $R^1$ and $R^2$ may be, but are not necessarily, identical. Thus, in a preferred embodiment, $R^1$ and $R^2$ can be independently selected from the group consisting of (i) aryl radical, (ii) aliphatic radical, and (iii) aryl radical linked to a second nitrogen atom to give a phenylene diamine.

Where $R^1$ is aliphatic, it can be a straight chain or branched it preferably has from one to twelve carbon atoms, e.g., methyl, ethyl, propyl, butyl, pentyl, hexyl, heptyl, octyl, nonyl, decyl, undecyl, dodecyl, and isomers thereof. It is preferred that, where $R^1$ is aliphatic, it be a straight or branched chain aliphatic group having from one to eight carbon atoms, and more preferred that it has from one to four carbon atoms.

The amine antioxidants may be hydrocarbon substituted diarylamines, such as, aryl, alkyl, alkaryl, and aralkyl substituted diphenylamine antioxidant materials. A nonlimiting list of commercially available hydrocarbon substituted diphenylamines includes substituted octylated, nonylated, and heptylated diphenylamines and para-substituted styrenated or α-methyl styrenated diphenylamines. The sulfur-containing hydrocarbon substituted diphenylamines, such as p-(p-toluenesulfonylamido)-diphenylamine, i.e.,

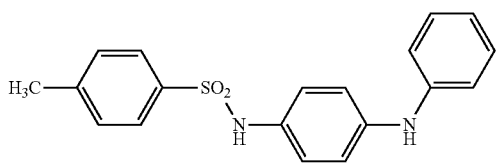

are also considered as part of this class.

Hydrocarbon-substituted diarylamines that are useful in the practice of this invention can be represented by the general formula

wherein Ar and Ar' are independently selected aryl radicals, at least one of which is preferably substituted with at least one alkyl radical. The aryl radicals can be, for example, phenyl, biphenyl, terphenyl, naphthyl, anthryl, phenanthryl, and the like. The alkyl substituent(s) can be, for example, methyl, ethyl, propyl, butyl, pentyl, hexyl, heptyl, octyl, nonyl, decyl, isomers thereof, and the like.

Preferred hydrocarbon-substituted diarylamines are those disclosed in U.S. Pat. Nos. 3,452,056 and 3,505,225, the disclosures of which are incorporated by reference herein. The preferred hydrocarbon-substituted diarylamines can be represented by the following general formulas:

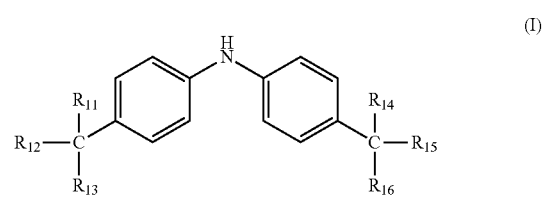

where $R_{11}$, is selected from the group consisting of phenyl and p-tolyl radicals; $R_{12}$ and $R_{13}$ are independently selected from the group consisting of methyl, phenyl, and p-tolyl radicals; $R_{14}$ is selected from the group consisting of methyl, phenyl, p-tolyl, and neopentyl radicals; $R_{15}$ is selected from the group consisting of methyl, phenyl, p-tolyl, and 2-phenylisobutyl radicals; and, $R_{16}$ is a methyl radical.

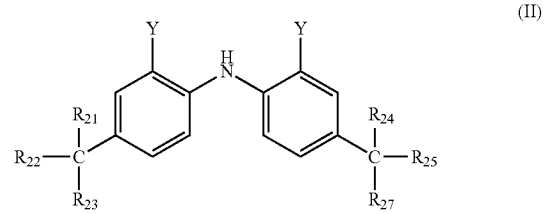

where $R_{21}$ through $R_{25}$, corresponding to $R_{11}$ to $R_{15}$ respectively, are independently selected from the radicals shown in Formula I and $R_{27}$ is selected from the group consisting of methyl, phenyl, and p-tolyl radicals;

X is a radical selected from the group consisting of methyl, ethyl, $C_3$-$C_{10}$ sec-alkyl, α,oc-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and, Y is a radical selected from the group consisting of hydrogen, methyl, ethyl, $C_3$-$C_{10}$ sec-alkyl, chlorine, and bromine.

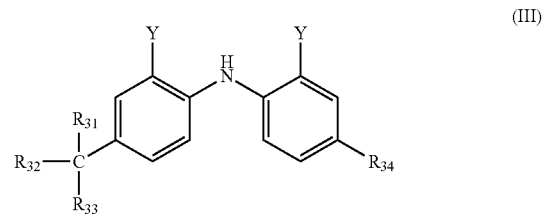

Where $R_{31}$ is selected from the group consisting of phenyl or p-tolyl radicals; $R_{32}$ and $R_{33}$ are independently selected from the group consisting of methyl, phenyl, and p-tolyl radicals; $R_{34}$ is a radical selected from the group consisting of hydrogen, $C_3$-$C_{10}$ primary, secondary, and tertiary alkyl, and $C_3$-$C_{10}$ alkoxyl, which may be straight chain or branched; and X and Y are radicals selected from the group consisting of hydrogen, methyl, ethyl, $C_3$-$C_{10}$ sec-alkyl, chlorine, and bromine.

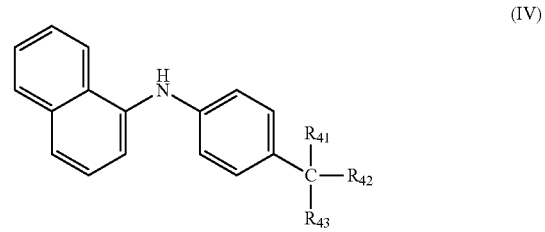

where $R_{41}$ is selected from the group consisting of phenyl and p-tolyl radicals; $R_{42}$ is a radical selected from the group consisting of methyl, phenyl, p-tolyl and 2-phenyl isobutyl; and $R_{43}$ is a radical selected from the group consisting of methyl, phenyl, and p-tolyl.

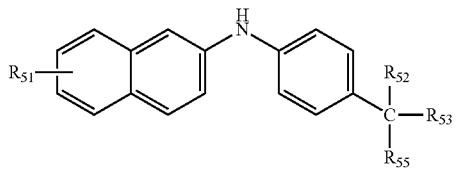
(V)

where $R_{51}$ is selected from the group consisting of hydrogen, α,cc-dimethylbenzyl, oc-methylbenzhydryl, triphenylmethyl, and α,oc p-trimethylbenzyl radicals; $R_{52}$ is selected from the group consisting of phenyl or p-tolyl radicals; $R_{53}$ is selected from the group consisting of methyl, phenyl, and p-tolyl radicals; and $R_{54}$ is selected from the group consisting of methyl, phenyl, p-tolyl, and 2-phenylisobutyl radicals. Examples of chemicals useful in the invention are the following:

TYPE I

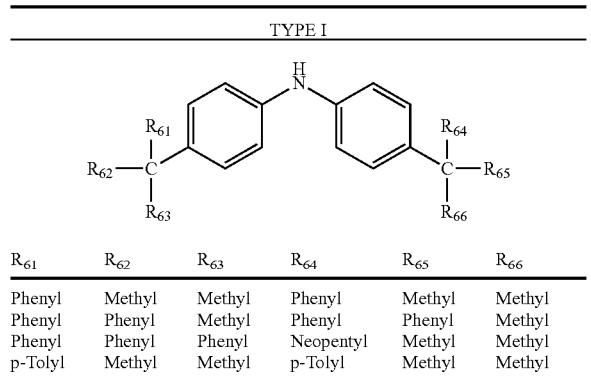

| $R_{61}$ | $R_{62}$ | $R_{63}$ | $R_{64}$ | $R_{65}$ | $R_{66}$ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| p-Tolyl | Methyl | Methyl | p-Tolyl | Methyl | Methyl |

TYPE II

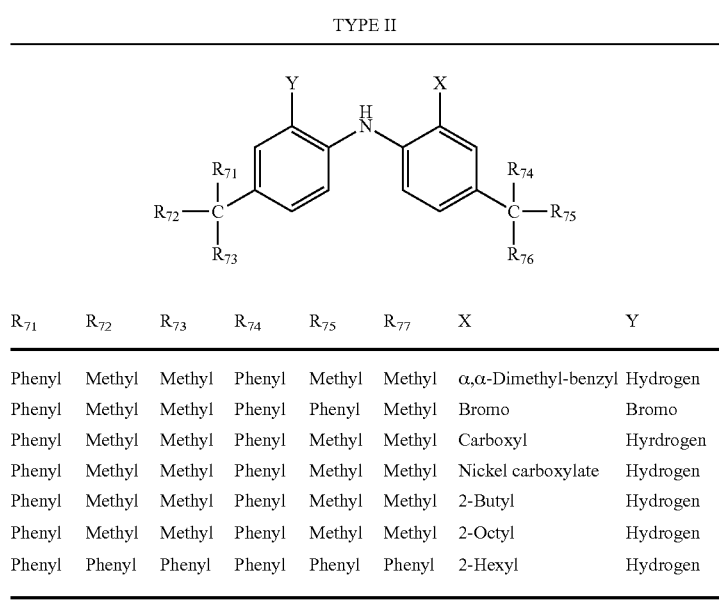

| $R_{71}$ | $R_{72}$ | $R_{73}$ | $R_{74}$ | $R_{75}$ | $R_{77}$ | X | Y |
|---|---|---|---|---|---|---|---|
| Phenyl | Methyl | Methyl | Phenyl | Methyl | Methyl | α,α-Dimethyl-benzyl | Hydrogen |
| Phenyl | Methyl | Methyl | Phenyl | Phenyl | Methyl | Bromo | Bromo |
| Phenyl | Methyl | Methyl | Phenyl | Methyl | Methyl | Carboxyl | Hyrdogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

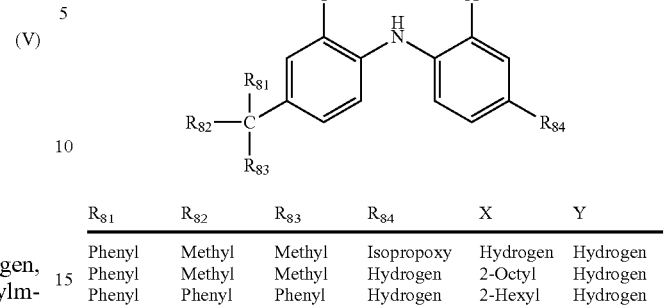

| $R_{81}$ | $R_{82}$ | $R_{83}$ | $R_{84}$ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

Of the foregoing preferred hydrocarbon-substituted diarylamines, the substituted diphenylamines of the formula:

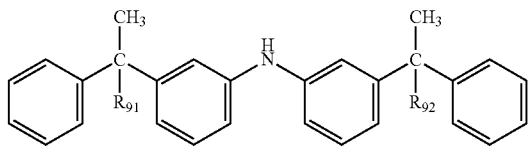

where $R_{91}$ and $R_{92}$ are methyl or phenyl are especially preferred. The compound wherein $R_{91}$ and $R_{92}$ are both methyl is 4,4'-bis(α,α-dimethylben2yl)diphenylamine and the compound wherein $R_{91}$ and $R_{92}$ are both phenyl is 4,4'-bis(α-methylbenzyl)diphenylamine.

A second class of amine antioxidants comprises the reaction products of a diarylamine and an aliphatic ketone. The diarylamine aliphatic ketone reaction products that are useful herein are disclosed in U.S. Pat. Nos. 1,906,935; 1,975,167; 2,002,642; and 2,562,802. Briefly described, these products are obtained by reacting a diarylamine, preferably a diphenylamine, which may, if desired, possess one or more substituents on either aryl group, with an aliphatic ketone, preferably acetone, in the presence of a suitable catalyst. In addition to diphenylamine, other suitable diarylamine reactants include dinaphthyl amines; p-nitrodiphenylamine; 2,4-dinitrodiphenylamine; p-aminodiphenylamine; p-hydroxydiphenylamine; and the like. In addition to acetone, other useful ketone reactants include methyl ethylketone, diethylketone, monochloroacetone, dichloroacetone, and the like.

A preferred diarylamine-aliphatic ketone reaction product is obtained from the condensation reaction of diphenylamine and acetone (NAUGARD $A_3$ Crompton Corporation), for example, in accordance with the conditions described in U.S. Pat. No. 2,562,802. The commercial product is supplied as a light tan-green powder or as greenish brown flakes and has a melting range of 85° to 95° C.

A third class of suitable amines comprises the N,N'hydrocarbon substituted p-phenylene diamines. The hydrocarbon substituent may be alkyl or aryl groups, which can be substituted or unsubstituted. As used herein, the term "alkyl," unless specifically described otherwise, is intended to include cycloalkyl. Representative materials are:

N-phenyl-N'-cyclohexyl-p-phenylenediamine;
N-phenyl-N'-sec-butyl-p-phenylenedi amine;
N-phenyl-N'-isopropyl-p-phenylenediamine;
N-phenyl-N'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamine; mixed diaryl-p-N,N'-bis-(1-ethyl-3-methylpentyl)-p-phenylenedianiines; and
N,N'-bis-(1-methylheptyl)-p-phenylenediamine.

A fourth class of amine antioxidants comprises materials based on quinoline, especially, polymerized 1,2-dihydro-2,2,4-trimethylquinoline (Naugard Super Q, Crompton Corporation). Representative materials also include 6-dodecyl-2,2,4-trimethyl-1,2-dihydroquinoline; 6-ethoxy-2,2,4-trimethyl-1-2-dihydroquinoline, and the like.

Secondary amines that are especially preferred for use in the practice of the present invention are 4,4'-bis($\alpha,\alpha$ dimethylbenzyl)diphenylamine (Naugard 445, Crompton Corporation), octylated diphenylamine (Naugard Octamine, Crompton Corporation), polymerized 1,2-dihydro-2,2,4-trimethylquinoline (Naugard Super Q, Crompton Corporation) and p-(p-toluene-sulfonylamido)-diphenyl amine (Naugard SA, Crompton Corporation). Most preferably, the secondary amine is 4,4'-bis($\alpha,\alpha$ dimethylbenzyl)diphenylamine.

Thioethers

Preferred thioethers that are useful in the practice of the present invention are exemplified by products such as distearylthiodipropionate (Naugard DSTDP, Crompton Corporation), dilaurylthiodipropionate (Naugard DLTDP, Crompton Corporation), pentaerythritol tetrakis($\beta$-laurylthiopropionate) (Seenox 412S, Crompton Corporation), and pentaerythritol octylthiopropionate (Naugard 2140, Crompton Corporation).

Di-Substituted Imidazolines

The di-substituted imidazoline is preferably selected from the group consisting of hydroxyethyl imidazolines, aminoethyl imidazolines and amidoethyl imidazolines. Preferably, the di-substituted imidazoline is a 1,2 di-substituted imidazoline. More preferably, the di-substituted imidazoline is a 1,2 di-substituted imidazoline of general formula:

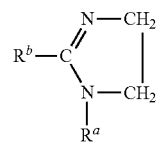

where $R^a$ is an aliphatic alkyl radical, optionally comprising a hydroxyl, an amino or an amide group.

Preferably, $R^a$ is selected from a group consisting of $C_2H_4OH$, $C_2H_4NH_2$, $C_2H_4NHCOR^c$.

$R^b$ and $R^c$, when applicable, are independently a $C_8$ to $C_{24}$ akyl radical. Preferably, $R^b$ and/or $R^c$ is an unsaturated alkyl radical.

Preferably the 1,2 di-substituted imidazoline is a 1-hydroxyethyl imidazoline (i.e $R^a$=$C_2H_4OH$ radical).

In an exemplary embodiment, the 1,2 di-substituted imidazoline is 1-hydroxyethyl 2-heptadecenyl imidazoline (CAS-NO 21652-27-7), which is available under the trade name of Rewopon® IM-OA (Evonik Goldschmidt).

Additives

In addition to the constituents mentioned here above, i.e. the polymeric components and the colour stabilisation system, the colour stable thermoplastic composition according to the invention may further comprise one or more auxiliary additives, such as fillers, reinforcing agents, further stabilizers, processing aids, colouring agents and fire retardants.

Fillers and reinforcing agents generally consist of inorganic fibrous materials and powder consisting of small particles, typically with a particle size below 1 mm, preferably below 0.1 mm, more preferably below 10 μm. Suitable examples of fillers are magnesium carbonate, kaolin, quartz, calcium carbonate. Suitable reinforcing agents include glass fibers and carbon fibres. The fillers and reinforcing agents are suitably used in a total amount of up to and even exceeding 50 wt. % of the total composition. Preferably, fillers and reinforcing agents are present in a total amount of 0-50 wt. %, more preferably 0.01-30 wt. %, or 0.1-20 wt. %, and most preferably 1-10 wt. %, relative to the total weight of the colour stable copolyester elastomer composition.

The other auxiliary additives are suitably present in a total amount of 0-20 wt. %, more preferably 0.01-10 wt. %, or 0.1-5 wt. %, and most preferably 1-3 wt. %, relative to the total weight of the colour stable copolyester elastomer composition Suitable further stabilizers include, for example, transesterification inhibitors, UV-stabilizers, heat stabilizers and anti-oxidants, as well as combined thermo-oxidative stabilizers. Additives suitable as heat stabilizer and/or and anti-oxidant are, for example, thioethers, hindered phenols, hydrochinones. Suitable UV-stabilisers are, for example, benzophenone, benzotriazoles, resorcinols, and salycilates. Further stabilizers are suitably present in a total amount of 0-3 wt. %, preferably 0.01-2 wt. %, or 0.05-1.5 wt. %, and most preferably 0.1-1 wt. %, relative to the total weight of the colour stable thermoplastic composition.

Suitable processing aids include mould release agents, such as fatty acids and derivatives thereof, including stearic acid, stearic alcohol and stearic amides, lubricants or viscosity reducers, and nucleating agents, such as talcum. These additives are suitably used in a total amount of 0-3 wt. %, preferably 0.01-2 wt. %, more preferably 0.1-1 wt. %, relative to the total weight of the colour stable copolyester elastomer composition.

Suitable colouring agents include pigments, such as titanium dioxide, and dyes, such as nigrosine. Colouring agents are also are suitably used in a total amount of 0-3 wt. %, preferably 0.01-2 wt. %, more preferably 0.1-1 wt. %, relative to the total weight of the flame retardant thermoplastic composition. The type and amount of colouring agent will be such that the colour lightness (L*) of the initial composition is greater than 50. The higher the L*, the lighter the appearance of the colour stable copolyester elastomer composition and thus the colour stabilising effects on the base polymer are more apparent.

In a specific embodiment of the invention, the colour stable thermoplastic composition comprises a colour stable copolyester elastomer composition, consisting of
A) 50-99.5 wt. % of a copolyester elastomer according to claim 1 of the invention,
B) 0.5-5 wt. % of a stabiliser package according to claim 1 of the invention; and optionally
C) 0-49.5 wt. % of another polymer;
D) 0-40 wt. % of a flame retardant;
E) 0-49.5 wt. % of one or more fillers and reinforcing agents, and
F) 0-20 wt. % of one or more other auxiliary additives,
wherein the weight percentages of (A), (B), (C), (D), (E) and (F) are relative to the total weight of the colour stable thermoplastic composition.

For the preparation of the colour stable thermoplastic composition, one can suitably compound the ingredients using melt-mixing equipment, such as single screw extruders, double screw extruders, Brabender mixers and Banburry kneaders.

The inventive compositions are very suited for making moulded articles or parts by means of various moulding techniques, including injection moulding and extrusion moulding and over moulding, in particular for the preparation of flexible moulded parts for various high demanding technical applications. For these applications, the good colour stabilization in combination with the high elasticity and retention of mechanical properties upon treatment under hot humid conditions are very advantageous.

The moulded articles or parts comprising the colour stable copolyester elastomer composition may be advantageously used in automobile components, especially those exposed to extended durations of high temperatures, such as greater than 100° C. or even 110° C.

EXAMPLES

Materials
Copolyester elastomer (A): 50 wt % Polyetherester elastomer comprising hard segments consisting of polybutyleneterephthalate segments and soft segments consisting of polytetrahydrofuran polyether block copolymer; hardness Shore-D 40.
50 wt % Polyetherester elastomer comprising hard segments consisting of polybutyleneterephthalate segments and soft segments consisting of polytetrahydrofuran polyether soft segments; hardness Shore-D 52.
Aromatic amine (B(i)): 4,4'-bis(α,α dimethylbenzyl)diphenylamine (Naugard® 445, Crompton Corporation)
Di-substituted imidazoline (B(ii)): 1-hydroxyethyl 2-heptadecenyl imidazoline (Rewopon® IM-OA, Evonik Goldschmidt)
Sample Composition (Parts per Weight Basis)
Sample 1 composition: 100 parts A, 1 part B(i) and 0.5 parts B(ii)
Sample A composition: 100 parts A and 1 part B(i)

Compounding
For the preparations of moulding compositions, ingredients were compounded in the weight ratios as indicated above. The moulding compositions were prepared by melt-blending the copolyester elastomer with the colour stabilizer package on a ZSK 30/33 twin-screw extruder with screw speed 200 rpm, throughput 10 kg/hr, and melt temperature regulated at 250° C., extruding the melt from the extruder through a die, and cooling and granulating the melt. The granules obtained by compounding in the extruder were dried for 24 hours at 120° C., prior to further use. Both samples had a L* value of above 90 determined in accordance with ASTM 308.

Methodology
To determine the colour intensity of the granulated samples, the sample was dissolved in m-cresol at a concentration of 1 part sample to 100 parts m-cresol. An initial UV-Vis spectroscopy scan was performed between the wavelengths of 300 to 800 nm. The maximum absorption peak (390 nm) of the initial sample was selected to evaluate changes of colour intensity of the material with time. Material samples were maintained at 125° C. in an oven and taken out and dissolved in m-cresol prior to the absorption at 390 nm being measured.

The results in table 1 confirm that the combined effect of di-substituted imidazoline and an aromatic amine leads to an initially lighter coloured copolyester elastomer in sample 1 of the example relative to sample A of the comparative experiment. Lower colour degradation was maintained in sample 1, relative to sample A, for at least 1100 hrs, as indicated using UV-Vis spectroscopy.

Visual inspection of the solid samples indicated that sample 1 remained lighter in colour compared to sample A after the samples had been held for 3000 hrs at 125° C.

TABLE 1

| Colour intensity of TPE at 125° C. with time | | | | |
|---|---|---|---|---|
| | Initial (0 hrs) | 23 hrs | 168 hrs | 1100 hrs |
| 1 | 0.2 | 0.2 | 0.4 | 0.5 |
| A | 0.6 | 0.6 | 0.6 | 0.6 |

The invention claimed is:
1. A colour stable thermoplastic composition comprising:
a copolyester elastomer; and
a stabilizer package comprising:
an aromatic amine; and
a di-substituted imidazoline, wherein
the colour lightness (L*) of the composition is greater than 50.
2. The composition of claim 1, wherein the aromatic amine is represented by the general formula:

$$R^1—NH—R^2$$

where $R^1$ and $R^2$ are independently selected from the group consisting of:
aryl radical
aliphatic radical; and
aryl radical linked to a second nitrogen atom thereby giving a phenylene diamine.
3. The composition according to claim 1, wherein the aromatic amine is a diarylamine.
4. The composition according to claim 1, wherein the aromatic amine is selected from a group consisting of 4,4'-bis(α, αdimethylbenzyl)diphenylamine, octylated diphenylamine, polymerized 1,2-dihydro-2,2,4-trimethylquinoline and p-(p-toluene-sulfonylamido)-diphenyl amine.

5. The composition according to claim 1, wherein the di-substituted imidazoline is selected from the group consisting of hydroxyethyl imidazoline, aminoethyl imidazoline and amidoethyl imidazoline.

6. The composition according to claim 5, wherein the di-substituted imidazoline is a hydroxyethyl imidazoline of general formula:

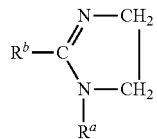

where $R^a$ is an aliphatic alkyl radical, optionally comprising a hydroxyl, an amino or an amide group; and
$R^b$ is a $C_8$ to $C_{24}$ alkyl radical.

7. The composition according to claim 6, wherein $R^a$ is a hydroxyethyl radical.

8. The composition according to claim 6, wherein the di-substituted imidazoline is 1-hydroxyethyl 2-heptadecenyl imidazoline.

9. The composition according to claim 1, wherein the composition comprises 0 to 5 parts by weight of the stabilizer package relative to 100 parts by weight of the copolyester elastomer.

10. The composition according to claim 1, wherein the weight ratio of the aromatic amine to the di-substituted imidazoline ranges between 0.1:1 and 10:1.

11. The composition according to claim 1, wherein the stabilizer package further comprises a thioether.

12. The composition according to claim 1, wherein the stabilizer package further comprises an anti-oxidant.

13. A moulded article comprising the composition according to claim 1.

* * * * *